Patented Dec. 6, 1949

2,490,247

UNITED STATES PATENT OFFICE 2,490,247

FLOOR TILE COMPOSITION

Lyle O. Amberg, Wilmington, Del., assignor to Hercules Powder Company, Wilmington, Del., a corporation of Delaware No Drawing. Application June 18, 1948, Serial No. 33,925

14 Claims. (Cl. 260—32.4)

This invention relates to floor tile compositions. More particularly, it relates to floor tile compositions containing polyvinyl chloride or polyvinyl acetate-chloride plasticized with novel improved plasticizers.

Mastic floor compositions containing plasticized polyvinyl chloride or polyvinyl acetate-chloride and various inert fillers and pigments are useful for the production of high-grade floor tiles. They are particularly desirable for the production of floor tiles having light shades of color. The plasticizers used in conjunction with the polyvinyl chloride and the polyvinyl acetate-chloride of these tile compositions are usually esters which are easily saponifiable. Consequently, floor tiles containing these plasticizers have not been entirely resistant to alkaline soaps and detergents used in floor cleaning. Substitutes for the ester-type plasticizers which would have higher alkali resistance have been urgently sought, but materials which have been tested as substitutes in the past have not had the desired low volatility and compatibility with the polyvinyl compounds. Moreover, they have not been found to contribute to the toughness, flexibility, impact strength, and dimensional stability if the floor tiles.

Now, in accordance with this invention, it has been found that mastic floor tile compositions having improved alkali resistance and excellent toughness, flexibility, impact strength, and dimensional stability are produced by employing as the plasticizer for the polyvinyl chloride or polyvinyl acetate-chloride binder of the floor tile composition a stabilized rosin acid nitrile. The stabilized rosin acid nitriles are completely compatible with polyvinyl chloride and with polyvinyl acetate-chloride and may be used as the sole plasticizer for the composition, or they may be used in conjunction with other plasticizers to improve the alkali resistance. The improvement in the floor tile compositions by replacement of only part of the ester-type plasticizer by stabilized rosin acid nitriles is outstanding, since the saponification of the ester-type plasticizers destroys only part of the plasticizer in the composition and the remaining composition plasticized with the stabilized rosin acid nitriles provides a hard, flexible, resistant surface coating to the tile.

The floor tiles of this invention may be produced by mixing the polyvinyl chloride or polyvinyl acetate-chloride with the stabilized rosin acid nitrile at a temperature sufficiently high to make the balsamlike stabilized rosin acid nitrile fluid. If desired, a small amount of volatile solvent such as acetone may be used to initiate the plasticizing action. Moreover, the blending of the polyvinyl chloride or polyvinyl acetate-chloride with the stabilized rosin acid nitrile may be greatly facilitated by using a previously plasticized polyvinyl chloride or polyvinyl acetate-chloride composition. The blending of these compositions with the plasticizers may be carried out directly on a heated two-roll mill, in which case any solvent which may have been used to initiate the plasticizing action will be lost by volatilization. In carying out the blending operation by use of a plasticized composition as a starting aid, the polyvinyl chloride or polyvinyl acetate-chloride and the stabilized rosin acid nitrile may be added alternately or simultaneously in small amounts while milling the plastic. Compounding of polyvinyl compounds with plasticizers is well known in the art and any of the well-known methods of blending and of adding solid components of the floor tile compositions may be used.

The following examples illustrate the compositions of this invention, using as the stabilized rosin acid nitrile both dehydrorosin acid nitrile and hydrorosin acid nitrile. All amounts are parts by weight.

| Example | 1 | 2 | 3 | 4 | 5 | 6 | 7 |
|---|---|---|---|---|---|---|---|
| Polyvinyl acetate-chloride [1] | 24 | 24 | 24 | 24 | 24 | 24 | ---- |
| Polyvinyl chloride | ---- | ---- | ---- | ---- | ---- | ---- | 50 |
| Dioctyl phthalate | 6 | 4 | 2 | ---- | 4 | ---- | ---- |
| Dehydrorosin acid nitrile | 2 | 4 | 6 | 8 | ---- | ---- | 30 |
| Hydrorosin acid nitrile | ---- | ---- | ---- | ---- | 4 | 8 | ---- |
| Lead silicate stabilizer | ---- | ---- | ---- | ---- | ---- | ---- | 1.0 |
| Ground calcite | 63.4 | 63.4 | 63.4 | 63.4 | 63.4 | 63.4 | 145 |
| Asbestos shorts | 3.7 | 3.7 | 3.7 | 3.7 | 3.7 | 3.7 | 8.5 |
| McBurney Indentation | 17.2 | 9.8 | 10.1 | 6.6 | 10.3 | 7.6 | 6.8 |
| Alkali resistance | G | G | E | E | G | E | E |

[1] About 12–15% vinyl acetate combined in the copolymer. Average molecular weight 10,000.
G=Good. E=Excellent.

In each of these examples, the polyvinyl chloride or polyvinyl acetate-chloride and the stabilized rosin acid nitrile were mixed on a two-roll mill at approximately 250° F. until fluxing was complete; the ground calcite was added and milling was continued at this temperature for three to five minutes; the asbestos was then added and the sheet was cross cut and cross rolled for about eight minutes; the back roll was then cooled to 150–200° F. and the material was sheeted off at an approximate thickness of 0.125 inch and allowed to cool. Samples of the sheets were tested for alkali resistance by immersion in 5% aqueous sodium hydroxide at room temperature for 24 hours and subsequently examining the samples for changes in flexibility and surface erosion. The alkali resistance was graded good when superior to octyl phthalate alone as the plasticizer and excellent when the degree of alkali resistance was outstanding. Samples were also tested for indentation by the McBurney indentation test (American Society for Testing Materials, 34th annual meeting, vol. 34, pages 591–603 (1934)).

Samples of the plasticized polyvinyl chloride and polyvinyl acetate-chloride in each of these examples milled as above, when taken off the mill in sheets prior to adding filler, were found to have improved tensile strength and hardness. Such a sheet made from the composition of Example 7 containing polyvinyl chloride, dehydrorosin acid nitrile, and stabilizer had an unusually high tensile strength and Shore "A" hardness (ten seconds at 770 F.). A similar sheet made by milling 50 parts polyvinyl chloride with 15 parts dioctyl phthalate and 15 parts dehydrorosin acid nitrile and one part lead silicate also gave a sheet having a high hardness and improved tensile strength.

The stabilized rosin acid nitriles used in accordance with this invention are nitriles having the nucleus corresponding to that of hydrogenated or dehydrogenated rosin acids and are prepared by heating hydrogenated or dehydrogenated (disproportionated) rosin or the corresponding rosin acids such as dihydroabietic acid, tetrahydroabietic acid, or dehydroabietic acid with ammonia. The reaction may be carried out by passing gaseous ammonia into liquid hydrogenated or dehydrogenated (disproportionated) rosin and removing the water of the reaction as fast as it is formed. The stabilized rosin acid nitriles may also be prepared by heating the hydrogenated or dehydrogenated (disproportionated) rosin or rosin acids with ammonia in the presence of a dehydration catalyst. Preferably, the nitrile should be purified by neutralization and distillation for use in accordance with this invention to remove contaminating impurities and color bodies.

The dehydrogenated (disproportionated) rosin used for conversion to the nitrile for use in the compositions of this invention is obtained by the dehydrogenation or disproportionation of natural rosin or a rosin material containing a substantial amount of a natural rosin, such as gum or wood rosin, or resin acids such as abietic acid. The dehydrogenation or disproportionation reaction may be carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, etc., are suitable. The catalyst may be supported on a carrier such as granular alumina, fibrous asbestos, or activated charcoal. Dehydrogenation or disproportionation with a palladium catalyst, for example, may be conducted either by a batchwise or continuous procedure. Thus, the rosin may be agitated with about 5% to about 20% by weight of a palladium catalyst supported on activated charcoal (1–2% palladium) at about 150° C. to about 300° C. for about one hour to about five hours. In the continuous process, the molten rosin flows over supported palladium catalyst at a temperature within the range of about 225° C. to about 300° C. to provide a contact time of about one-quarter hour to about one hour. Other methods of preparing the dehydrogenated or disproportionated rosin may be used, if desired.

The hydrogenated rosin used for conversion to the hydrorosin acid nitrile for use in the compositions of this invention is obtained by reducing the unsaturation of a rosin material such as wood or gum rosin or resin acids such as abietic acid by contacting the rosin material in a fluid state with hydrogen in the presence of an active base metal hydrogenation catalyst, such as activated nickel, Raney nickel, copper chromite, cobalt, etc., under pressure, for example, a hydrogen pressure of 200 to 1500 lb./sq. in. and at a temperature of about 125° C. to about 225° C. for about one-half hour to about five hours. A highly active platinum or palladium oxide catalyst may also be employed, in which case the reaction is usually carried out at room temperature under a relatively low hydrogen pressure and in the presence of an inert reaction medium such as acetic acid. Many other variations of the hydrogenation reaction may be utilized.

The amount of plasticizer which may be used in conjunction with the polyvinyl chloride or polyvinyl acetate-chloride compositions of this invention as plasticizers therefor is within the range of about 10% to about 100% by weight of the polyvinyl resin. The most satisfactory floor tiles, however, are those containing from about 25% to about 60% plasticizer, based on the weight of the polyvinyl resin when the optimum amount of 15% to 25% of the total plasticizer is stabilized rosin acid nitrile.

The stabilized rosin acid nitrile may be used as the sole plasticizer or it may be used in conjunction with an ester-type stabilizer to give improved alkali resistance and other improved characteristics to the floor tile compositions. At least about 15% of the total plasticizer should be stabilized rosin acid nitrile to give a noticeable improvement in the characteristics of the floor tile compositions. Floor tile compositions having all of the improved characteristics of this invention and showing the most satisfactory resilience for a floor covering are those in which 15% to about 25% of the total plasticizer is the stabilized rosin acid nitrile.

The polyvinyl acetate-chloride may be any copolymer of vinyl chloride and vinyl acetate produced from a mixture containing at least 85% vinyl chloride and having an average molecular weight from 6,000 to 24,000. A polyvinyl acetate-chloride having an average molecular weight of about 10,000 to about 24,000 is preferred. The polyvinyl chloride of this invention is preferably gamma-polyvinyl chloride of the compositions described in U. S. Patent No. 1,929,453.

Ester-type plasticizers which may be used in admixture with stabilized rosin acid nitriles in the compositions of this invention include neutral esters of phthalic acid and alcohols having six to nine carbon atoms, such as dioctyl phthalate, dinonyl phthalate, bis(2-ethylhexyl) phthalate, bis(2-ethylbuytl) phthalate; neutral phosphoric acid esters, such as tributyl phosphate, tricresyl phosphate, and triphenyl phosphate; neutral esters of sebacic acids and alcohols having four to six carbon atoms, such as dibutyl sebacate and bis(2-ethylbutyl) sebacate; neutral phthalyl glycolates of alcohols having one to four carbon atoms, such as methyl phthalyl methyl glycolate, ethyl phthalyl ethyl glycolate, butyl phthalyl butyl glycolate, and esters of alkoxy glycols, such as methoxy glycol sebacate, butoxy glycol adipate, and methoxy glycol phthalate; and similar esters. The preferred plasticizers for use in conjunction with the stabilized rosin acid nitrile are the neutral esters of phthalic acids and alcohols having six to nine carbon atoms. Dioctyl phthalate is the preferred ester of this type.

Various kinds of fillers may be utilized in the floor tile compositions of this invention. Inert fillers such as inorganic fillers are preferred. Both fibrous and nonfibrous fillers may be used, although it is customary to always employ asbestos fibers as one of the ingredients. When nonfibrous fillers are employed, they are usually used in conjunction with a small proportion of a fibrous material such as asbestos fiber. Suitable nonfibrous fillers include barytes, China clay, silica, whiting, calcium carbonate, asbestine, slate dust and ground calcite, etc. In addition to the fillers, various pigments may be employed in the composition to impart the desired color, as, for example, titanium dioxide, iron oxide, lead chromate, etc. The amount of filler used in the floor tile compositions is that which is sufficient to give a floor tile having a penetration at 77° F. by the McBurney indentation test (applied to a floor tile of one-quarter inch thickness) of less than about 25 mils in ten minutes by a 30-pound load acting through a one-quarter inch sphere. The amount of filler will thus vary somewhat according to the plasticity of the binder as effected by the type and amount of plasticizer used. In general, more filler will be required when the plasticizer is used in the larger amounts. The amount of filler will generally be within the range of about 40% to about 90% of the floor tile composition when a tile meeting the proper indentation value is produced. Usually, the lower percentages are used for bulky or low density fillers and the higher percentages are used for compact or high density fillers.

The plasticized polyvinyl chloride and polyvinyl acetate-chloride compositions used as the binder in the floor tiles of this invention are preferably stabilized by the addition of well-known stabilizers for the polyvinyl compounds, such as lead silicate, lead oxide, lead salts of p-tert-butyl phenol, and sodium and calcium silicates.

In addition to contributing to the floor tile compositions of this invention the characteristic of alkali resistance, the stabilized rosin acid nitriles also have the advantage of low volatility and thus contribute to the aging characteristics of the floor tile when not subjected to alkaline washing compounds. Moreover, the stabilized rosin acid nitriles also contribute to the general appearance of the floor tiles by giving a more glossy appearance, especially when waxed with the usual floor waxes.

What I claim and desire to protect by Letters Patent is:

1. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is a rosin acid nitrile selected from the group consisting of dehydrorosin acid nitrile and hydrorosin acid nitrile, and a filler.

2. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is a dehydrorosin acid nitrile, and a filler.

3. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is dehydroabietonitrile, and a filler.

4. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is hydrorosin acid nitrile, and a filler.

5. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is dihydrorosin acid nitrile, and a filler.

6. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is dihydroabietonitrile, and a filler.

7. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 10% and about 100% of said vinyl polymer, at least about 15% of which plasticizer is tetrahydrorosin acid nitrile, and a filler.

8. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is tetrahydroabietonitrile, and a filler.

9. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is dehydroabietonitrile, and a filler, the amount of said filler being sufficient to give a floor tile having a penetration at 77° F. by the McBurney Indentation Test of less than about 25 mils in ten minutes by a 30-pound load acting through a one-quarter inch sphere.

10. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is dihydroabietonitrile, and a filler, the amount of said filler being sufficient to give a floor tile having a penetration at 77° F. by the McBurney Indentation Test of less than about 25 mils in ten minutes by a 30-pound load acting through a one-quarter inch sphere.

11. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is tetrahydroabietonitrile, and a filler, the amount of said filler being sufficient to give a floor tile having a penetration at 77° F. by the McBurney Indentation Test of less than about 25 mils in ten minutes by a 30-pound load acting through a one-quarter inch sphere.

12. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is dehydroabietonitrile and the complement of said plasticizer is dioctyl phthalate, and a filler containing a small proportion of fibrous material, the amount of said filler being sufficient to give a floor tile having a penetration at 77° F. by the McBurney Indentation Test of less than about 25 mils in ten minutes by a 30-pound load acting through a one-quarter inch sphere.

13. An alkali-resistant mastic floor tile composition comprising essentially a vinyl polymer selected from the group consisting of polyvinyl chloride and polyvinyl acetate-chloride, a plasticizer for the vinyl poylmer in an amount within the range of about 25% and about 60% of said vinyl polymer, at least about 15% of which plasticizer is dihydroabietonitrile and the complement of said plasticizer is dioctyl phthalate, and a filler containing a small proportion of fibrous material, the amount of said filler being sufficient to give a floor tile having a penetration at 77° F. by the McBurney Indentation Test of less than about 25 mils in ten minutes by a 30-pound load acting through a one-quarter inch sphere.

14. An alkali-resistant mastic floor tile composition comprising essentially a vinyl polymer selected from the group consisting of polyvinyl chloride and polyvinyl acetate-chloride, a plasticizer for the vinyl polymer in an amount within the range of about 25% and about 60% of said vinyl polymer, at least about 15% of which plasticizer is tetrahydroabietonitrile and the complement of said plasticizer is dioctyl phthalate, and a filler containing a small proportion of fibrous material, the amount of said filler being sufficient to give a floor tile having a penetration at 77° F. by the McBurney Indentation Test of less than about 25 mils in ten minutes by a 30-pound load acting through a one-quarter inch sphere.

LYLE O. AMBERG.

REFERENCES CITED

The following references are of record in the file of this patent:

UNITED STATES PATENTS

| Number | Name | Date |
| --- | --- | --- |
| 2,362,934 | Schlaanstine | Nov. 14, 1944 |
| 2,461,349 | Ralston et al | Feb. 8, 1949 |